United States Patent [19]

Epstein

[11] 4,172,859

[45] Oct. 30, 1979

[54] TOUGH THERMOPLASTIC POLYESTER COMPOSITIONS

[75] Inventor: Bennett N. Epstein, Wilmington, Del.

[73] Assignee: E. I. Du Pont de Nemours and Company, Wilmington, Del.

[21] Appl. No.: 580,514

[22] Filed: May 23, 1975

[51] Int. Cl.$^2$ .............................................. C08L 67/02
[52] U.S. Cl. .................................. 428/402; 525/109; 525/111; 525/174; 525/187
[58] Field of Search ......... 260/842, 843, 835, 857 PE, 260/860, 873

[56] References Cited

U.S. PATENT DOCUMENTS

| | | | |
|---|---|---|---|
| 3,005,795 | 10/1961 | Busse | 260/857 L |
| 3,405,198 | 10/1968 | Rein | 260/873 |
| 3,578,730 | 5/1971 | Herwig | 260/873 |
| 3,644,303 | 2/1972 | Berger | 260/873 |
| 3,723,373 | 3/1973 | Lucas | 260/873 |
| 3,769,260 | 10/1973 | Segal | 260/873 |

FOREIGN PATENT DOCUMENTS 1208585 10/1970 United Kingdom.
1279836 6/1972 United Kingdom.

OTHER PUBLICATIONS

Modern Plastics Encyclopedia, vol. 51, No. 10A, Oct. 1974, pp. 558+559.

Primary Examiner—Paul R. Michl

[57] ABSTRACT

Toughened multi-phase thermoplastic composition consisting essentially of one phase containing 60 to 99 percent by weight of a polyester including polycarbonate matrix resin of inherent viscosity of at least 0.35 deciliter/gram, and 1 to 40 percent by weight of at least one other phase containing particles of at least one random copolymer having a particle size in the range of 0.01 to 3.0 microns and being adhered to the polyester, the at least one random copolymer having a tensile modulus in the range of 1.0 to 20,000 p.s.i., the ratio of the tensile modulus of the polyester matrix resin to tensile modulus of said at least one polymer being greater than 10 to 1. Said at least one polymer is either a branched or straight chain polymer. The toughened compositions are useful for making molded and extruded parts. Such parts possess greater ductility, less reduction in toughness from scratches and molded in notches and reduced susceptibility to catastrophic failure when compared to known melt fabricated materials.

34 Claims, No Drawings

TOUGH THERMOPLASTIC POLYESTER COMPOSITIONS

BACKGROUND OF THE INVENTION

1. Field of the Invention

This invention relates to thermoplastic compositions, and more particularly to polyester including polycarbonate compositions having improved ductility or toughness, and to the processes for preparing such compositions.

2. Description of the Prior Art

Unmodified thermoplastic polyesters are frequently regarded as "tough". For example, some polyesters have good elongation; high energy to break, as demonstrated in tensile tests; high tensile impact strength and high energy absorption as demonstrated in falling dart tests, e.g., the Gardner impact test. In one aspect of toughness the polyester materials are quite erratic; namely, resistance to crack propagation. This deficiency is reflected in notch sensitivity, brittle breaks and occasional catastrophic failure of molded or extruded parts. The tendency of some polyesters to break in a brittle rather than ductile fashion is a significant limitation of utility. A resin may be characterized in its tendency toward ductility by the notched Izod test ASTM D-256-56. With the normal notch radius of 10 mils, polyethylene terephthalate and polybutylene terephthalate will have notched Izod values of about 0.3 to 1 ft. lb./inch of notch. Polyesters known as polycarbonates may have values in the range of 10 to 15 ft. lbs./inch of notch in ⅛ inch sections, but the value falls off rapidly when the notch radius is decreased or thicker samples are used.

There is much prior art concerned with improving the impact strength of polyesters. A variety of additives have been added to polyesters with some improvement in toughness being obtained. British Pat. No. 1,208,585 discloses that a notched Izod of 4.3 ft. lbs./inch can be achieved with the addition of 25 percent by weight terpolymer to the polyester. British Pat. No. 1,208,585 fails to recognize that combination of properties necessary to achieve high toughess. For example, particle size ranges from 0.5 to 10 microns; if the size is too small the improvement in impact strength may be reduced. In addition, the material which causes the adherence is not present in the phase with the at least one polymer.

Cope U.S. Pat. No. 3,435,093 discloses blends of polyethylene terephthalate and an ionic hydrocarbon copolymer of α-olefins of the formula R—CH=CH$_2$ where R is hydrogen or an alkyl radical of 1 to 3 carbon atoms and α,β-ethylenically unsaturated carboxylic acids containing 3 to 5 carbon atoms, the carboxylic acid groups of the ionic copolymer being 0 to 100 percent neutralized by metal cations. Cope states that improvement in toughness is achieved by the blends. Cope, however, did not recognize that improved toughness of polyester compositions can be achieved provided that at least one polymer present has a small particle size, a tensile modulus of 20,000 or less and the ratio of the tensile modulus of the polyester to the tensile modulus of said polymer is greater than 10 to 1.

Gander et al. U.S. application Ser. No. 488,826, filed July 15, 1974, discloses a polyethylene terephthalate/terpolymer blend, the terpolymer being present in 1 to 5 percent by weight and comprising at least 65 percent by weight ethylene with (a) at least 5 percent by weight of vinyl ester of a 1 to 6 carbon atom saturated monobasic aliphatic carboxylic acid and (b) 0.5 to 10 percent by weight of acrylic or methacrylic acid. It is disclosed that polyethylene terephthalate blended with the terpolymer is tough. It is not taught that improved toughness can be achieved in polyesters if the particle size, tensile modulus of the at least one polymer and the ratio of tensile modulus of the at least one polymer and the polyester matrix resin are maintained within certain ranges.

French Pat. No. 2,194,741 relates to blends of polyesters melting above 100° C. with 1.5 to 90 percent by weight of a copolyether ester. Impact strength is said to be improved. The copolyether esters are block copolymers rather than random copolymers. There is no teaching that tensile modulus, ratios of tensile modulus and particle size of the polymer additive are necessary to provide improved toughness.

Polycarbonates are known to be among the tougher materials used for molded and extruded parts. Kim U.S. Pat. No. 3,334,154 is an example. It has been found, however, that when polycarbonates have been tested for toughness using the notched Izod test as indicated above the toughness is a function of the notch radius. This disadvantage is substantially eliminated when at least one polymer according to this invention is present with the polycarbonate.

SUMMARY OF THE INVENTION

According to this invention, there is provided a toughened multi-phase thermoplastic composition consisting essentially of one phase containing 60 to 99 percent by weight of a matrix resin taken from the class consisting of (a) polyester matrix resin having an inherent viscosity in the range of about 0.4 to 4.0 deciliters/gram, said polyester being prepared from an aromatic dicarboxylic acid having from 8 to 14 carbon atoms and at least one glycol taken from the class consisting of a glycol of the formula HO(CH$_2$)$_n$OH where n is an integer of 2 to 10, neopentyl glycol and cyclohexane dimethanol, a portion of the moles of acid being replaceable by at least one acid taken from the group consisting of at least one different aromatic dicarboxylic acid having from 8 to 14 carbon atoms in an amount up to 50 mole percent, and an aliphatic dicarboxylic acid having from 2 to 12 carbon atoms in an amount up to 20 mole percent; and (b) polycarbonate matrix resin having an inherent viscosity in the range of about 0.35 to 0.75 deciliter/gram, said polycarbonate possessing recurring structural units of the formula:

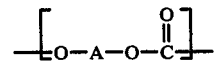

where A is a divalent aromatic radical of a dihydric phenol; and 1 to 40 percent by weight of at least one other phase containing particles of at least one random copolymer taken from the class consisting of branched and straight chain polymers, said at least one random copolymer having a particle size in the range of 0.01 to 3.0 microns, being adhered to the matrix resin, and having a tensile modulus in the range of about 1.0 to 20,000 p.s.i., the ratio of the tensile modulus of the matrix resin to tensile modulus of said at least one random copolymer being greater than 10 to 1.

The term "consisting essentially of" means that in addition to the required matrix resin and the at least one random copolymer, other components can be present in the toughened composition provided that the basic and essential characteristics of the toughened composition are not materially affected thereby.

The term "branched and straight chain polymers" means that the polymers are not crosslinked to a degree which will increase their modulus to greater than 20,000 p.s.i. or decrease their melt flow to a level which prevents effective dispersion.

According to another aspect of this invention, there is provided a process for the preparation of a toughened multi-phase thermoplastic composition which comprises, in a closed system, (A) admixing (1) 60 to 99 percent by weight of a matrix resin taken from the class consisting of (a) polyester matrix resin and (b) polycarbonate as defined above, and (2) 1 to 40 percent by weight of at least one random copolymer at a temperature in the range of about 5 to 100° C. above the melting point of said matrix resin and (B) shearing to disperse the at least one random copolymer in said matrix to a particle size in the range of 0.01 to 3.0 microns, said at least one random copolymer being adhered to said matrix and having a tensile modulus in the range of 1.0 to 20,000 p.s.i., the ratio of the tensile modulus of said matrix to tensile modulus of said at least one random copolymer being greater than 10 to 1.

DETAILED DESCRIPTION OF THE INVENTION

The resins that function as the matrix resin of the toughened compositions of this invention are well known in the art. The matrix resins can be of the polyester types as described above having an inherent viscosity in the range of about 0.4 to 4.0 deciliters/gram, the polycarbonate types also as described above having an inherent viscosity in the range of about 0.35 to 0.75 deciliter/gram and mixtures of said resins.

The term "polyester resins" includes, in general, linear saturated condensation products of glycols and dicarboxylic acids, or reactive derivatives thereof. Preferably, they will comprise condensation products of aromatic dicarboxylic acids having 8 to 14 carbon atoms and at least one glycol of the formula $HO(CH_2)_nOH$ where n is an integer of 2 to 10, neopentyl glycol, and cyclohexane dimethanol. Up to 50 mole percent of the aromatic dicarboxylic acids can be replaced by at least one different aromatic dicarboxylic acid having from 8 to 14 carbon atoms, and/or up to 20 mole percent can be replaced by an aliphatic dicarboxylic acid having from 2 to 12 carbon atoms.

The preferred polyesters are well known as film and fiber formers, and they are provided by methods outlined in Whinfield et al. U.S. Pat. No. 2,465,319 and Pengilly U.S. Pat. No. 3,047,539. The preferred polyesters will comprise polyethylene terephthalate; poly(1,4-butylene) terephthalate; and 1,4-cyclohexylene dimethylene terephthalate/isophthalate copolymer and other linear homopolymer esters derived from aromatic dicarboxylic acids, including isophthalic, bibenzoic, naphthalene-dicarboxylic including the 1,5-; 2,6-; and 2,7-naphthalenedicarboxylic acids; 4,4'-diphenylenedicarboxylic acid; bis(p-carboxyphenyl) methane; ethylene-bis-p-benzoic acid; 1,4-tetramethylene bis(p-oxybenzoic) acid; ethylene bis(p-oxybenzoic) acid; 1,3-trimethylene bis(p-oxybenzoic) acid; and 1,4-tetramethylene bis(p-oxybenzoic acid, and glycols of the general formula $HO(CH_2)_nOH$ where n is an integer from 2 to 10, e.g., ethylene glycol; 1,3-trimethylene glycol; 1,4-tetramethylene glycol; 1,6-hexamethylene glycol; 1,8-octamethylene glycol; 1,10-decamethylene glycol; 2,2-dimethyl-1,3-propane diol; 1,3-propylene glycol; 1,4-butylene glycol; neopentyl glycol and cyclohexane dimethanol. Up to 20 mole percent, as indicated above, of one or more aliphatic acids, including adipic, sebacic, azelaic, dodecanedioic acid or 1,4-cyclohexanedicarboxylic acid can be present. it is understood that the polyesters may include minor quantities of ethers incidentally formed as by-products from the glycols employed in the preparation of the polymeric ester.

The inherent viscosity of the polyesters and polycarbonates is measured at a concentration of 0.32 g./100 ml. in trifluoroacetic acid (25)/methylene chloride (75) at 25±0.10° C. It is computed by the formula:

$$\text{Inherent Viscosity} = \frac{\text{natural log } \frac{\text{elution time of solution}}{\text{elution of solvent}}}{C}$$

where C is the concentration expressed in grams of polymer per 100 milliliters of solution. The viscometer used is a calibrated Ostwald-Cannon-Finske viscometer No. 50 (Ace Glass Co.).

The term "polycarbonate resin" as used herein is meant to embrace within its scope carbonate polymers of dihydric phenols as well as carbonate copolymers of such dihydric phenols of glycols, such as ethylene glycol or propylene glycol, for example; dibasic acids, such as, for example, isophthalic or terephthalic acid; and hydroxyl or acid-terminated polyesters, such as, for example, the hydroxyl or acid-terminated polyester of neopentyl glycol and adipic acid. Such polycarbonate resins may be prepared by reacting a dihydric phenol with a carbonate precursor such as phosgene, a haloformate or a carbonate ester. Generally speaking, the resulting carbonate polymers may be typified as possessing recurring structural units of the formula:

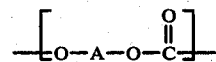

where A is a divalent aromatic radical of the dihydric phenol, preferably bisphenol A, employed in the polymer producing reaction. Preferably, the polycarbonate resins have inherent viscosities (as measured in p-dioxane in deciliters per gram at 30° C.) ranging from about 0.35 to about 0.75. The dihydric phenols which may be employed to provide such aromatic carbonate polymers are mononuclear or polynuclear aromatic compounds, containing as functional groups, two hydroxyl radicals, each of which is attached directly to a carbon atom of an aromatic nucleus. Typical dihydric phenols are 2,2 bis-(4-hydroxyphenyl)propane; hydroquinone;resorcinol; 2,2 bis-(4-hydroxyphenyl)-pentane; 2,4' dihydroxydiphenyl methane; bis-(2-hydroxyphenyl)-methane; bis(4-hydroxyphenyl)-methane; bis-(4-hydroxy-5-nitrophenyl)-methane; 1,1bis-(4-hydroxyphenyl)-ethane; 3,3 bis-(4-hydroxyphenyl)-pentane; 2,2' -dihydroxydiphenyl; 2,6 dihydroxy naphthalene; bis-(4-hydroxyphenyl)-sulfone; 2,2' dihydroxydiphenyl sulfone; 4,4' dihydroxydiphenyl ether; and 4,4' dihydroxy-2,5-diethoxydiphenyl ether. A variety of additional dihydric phenols which may be employed to provide such carbonate polymers are disclosed in Goldberg U.S. Pat. No. 2,999,835. It is, of course, possible to employ two or more different dihydric phenols or, as stated above, a dihydric phenol in combination with a glycol, a hydroxy or acid-terminated polyester, or a dibasic acid in the event a carbonate copolymer rather than a homopolymer is desired.

As great as 99 percent by weight of the composition can be composed of matrix resin; however, preferred compositions contain from 60 to 99 percent, and more narrowly 80 to 95 percent, by weight of matrix resin.

The composition is toughened by the combination of at least one random copolymer with the matrix resin. The term "at least one random copolymer" means one or more copolymers, and optionally one or more homopolymers, which coexist in single discrete particles having a particle size ranging from 0.01 to 3 microns, preferably 0.02 to 1 micron, within the matrix, so that either the mixture of polymers or at least one of the copolymers in the mixture meets the following criteria.

(a) sites which adhere to the matrix resin;
(b) tensile modulus, as added, in the range of about 1.0 to 20,000 p.s.i., preferably about 5 to 20,000 p.s.i., the ratio of tensile modulus of the matrix resin to tensile modulus of said at least one random copolymer being greater than 10 to 1, preferably greater than 20 to 1.

The matrix resin is the continuous phase in the composition and the at least one random copolymer, sometimes referred to as polymer, performs the function of a soft dispersed phase which is adhered to the matrix resin. The polymer may be elastomeric, but it has been found that thermoplastic polymers which are not elastomeric are also effective in the compositions.

The polymers are branched or straight chain and are of such composition that crosslinking other than by reaction with the matrix resin is not necessary to their function and excessive crosslinking may, in fact, be harmful.

Branched and straight chain polymers useful as the soft phase of the composition are represented by the formula:

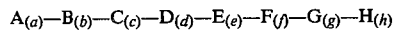

$$A_{(a)}-B_{(b)}-C_{(c)}-D_{(d)}-E_{(e)}-F_{(f)}-G_{(g)}-H_{(h)}$$

derived in any order, e.g., random, from monomers A to H where

A is ethylene;
B is CO;
C is an unsaturated monomer taken from the class consisting of $\alpha,\beta$-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;
D is an unsaturated epoxide of 4 to 11 carbon atoms;
E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;
F is an unsaturated monomer taken from the class consisting of acrylate esters having from 4 to 22 carbon atoms, vinyl esters of acids having from 1 to 20 carbon atoms (substantially no residual acid), vinyl ethers of 3 to 20 carbon atoms, and vinyl and vinylidene halides, and nitriles having from 3 to 6 carbon atoms;
G is an unsaturated monomer having pendant hydrocarbon chains of 1 to 12 carbon atoms capable of being grafted with monomers having at least one reactive group of the type defined in C, D and E, and pendant aromatic groups which may have 1 to 6 substituent groups having a total of 14 carbon atoms; and
H is an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E.

The aforementioned monomers may be present in the polymer in the following mole fraction:
(a) 0 to 0.95;
(b) 0 to 0.3;
(c) 0 to 0.5;
(d) 0 to 0.5;
(e) 0 to 0.5;
(f) 0 to 0.99;
(g) 0 to 0.99; and
(h) 0 to 0.99 so that the total of all components is a mole fraction of 1.0.

Preferably (a) to (h) are present in the following mole fraction:
(a) 0 to 0.9;
(b) 0 to 0.2, most preferably 0.1 to 0.2;
(c) 0.0002 to 0.2, most preferably 0.002 to 0.05;
(d) 0.005 to 0.2, most preferably 0.01 to 0.1;
(e) 0.0002 to 0.1, most preferably 0.002 to 0.01;
(f) 0 to 0.98;
(g) 0 to 0.98; and
(h) 0 to 0.98

At least one of B, C, D and E is present in all polymeric systems. When A is present, in addition to at least one of B, C, D and E being present, at least one of F, G and H is also present. A mixture of two or more polymers can be used with the proviso that at least one of B, C, D and E is present in at least one of the copolymers.

The copolymeric component of the toughened composition may be prepared by standard copolymerization reaction or by a grafting reaction. Thus B, C, D and E may be copolymerized with A, F, G and H and C, D and E may be added by a grafting reaction.

Illustrative of monomers C to H of the above formula are:
C is maleic acid, maleic anhydride, maleic acid monoethyl ester, metal salts of acid monoethyl ester, fumaric acid, fumaric acid monoethyl ester, itaconic acid, vinyl benzoic acid, vinyl phthalic acid, metal salts of fumaric acid monoethyl ester, monoesters of maleic, fumaric, itaconic acids with R where R is up to 29 carbon atoms, e.g., methyl, propyl, isopropyl, butyl, isobutyl, hexyl, cyclohexyl, octyl 2-ethyl hexyl, decyl, stearyl, methoxy ethyl, ethoxy ethyl, hydroxy ethyl, etc.

D is glycidyl methacrylate, glycidyl acrylate, allyl glycidyl ether, vinyl glycidyl ether, glycidyl itaconate, etc.;

E is phthalic anhydride sulfonyl azide, methyl ester and monooctadecyl ester of phthalic anhydride sulfonyl azide, benzoic acid sulfonyl azide, naphthoic acid sulfonyl azide, naphthoic diacid sulfonyl azide, R-monoesters (and metal salts thereof) of phthalic acid and naphthoic diacid sulfonyl azide, where R is up to 29 carbon atoms, etc.;

F is methyl methacrylate, methyl, ethyl and butyl acrylate, vinyl acetate, methyl vinyl ether, zince methacrylate, acrylonitrile, R—esters of acrylic, methacrylic acids; R—vinyl ethers, vinyl benzoate, vinyl naphthoate, vinyl esters of R-acids, where R is up to 18 carbon atoms, vinyl chloride, vinylidene fluoride, etc.;

G is styrene, propylene, isobutylene, vinyl naphthalene, vinyl pyridine, vinyl pyrrolidone, mono-, di-, trichloro styrene, R'-styrene where R' is 1 to 10 carbon atoms, butene, hexene, octene, decene, etc.; and H is hexadiene, norbornadiene, butadiene, isoprene, divinyl, allyl styrene, etc.

Useful copolymers for toughening polyester or polycarbonate compositions are the following alternating or primarily random copolymers: zinc salt of ethylene/isobutyl acrylate/methacrylic acid; ethylene/methyl acrylate/monoethyl ester of maleic anhydride and 0 to 100 percent neutralized zinc, sodium, calcium, lithium, antimony, and potassium salts thereof; ethylene/methyl acrylate/mixture of ethylene/isobutyl acrylate/methacrylic acid and ethylene/methyl acrylate/monoethyl ester of maleic anhydride and zinc salts thereof; ethylene/methyl acrylate/methacrylic acid and zinc salts thereof; ethylene/vinyl acetate/methacrylic acid and zinc salts thereof; ethylene/methyl methacrylate/methacrylic acid and zinc salts thereof; ethylene/vinyl acetate/carbon monoxide; mixtures of ethylene/vinyl acetate/carbon monoxide and a zinc salt of ethylene/isobutyl acrylate/methacrylic acid; mixtures of ethylene/vinyl acetate and a zinc salt of ethylene/isobutyl acrylate/methacrylic acid; mixtures of ethylene/isobutyl acrylate and a zinc salt of ethylene/isobutyl acrylate/methacrylic acid; mixtures of ethylene/acrylic acid and ethylene/vinyl acetate; ethylene/isobutyl acrylate/carbon monoxide; ethylene/stearyl methacrylate/carbon monoxide; ethylene/n-butyl acrylate/carbon monoxide; ethylene/2-ethyl hexyl methacrylate/carbon monoxide; ethylene/methyl vinyl ether/carbon monoxide; ethylene/vinyl acetate/maleic anhydride; ethylene/vinyl acetate monoethyl ester of maleic anhydride; ethylene/vinyl acetate/glycidyl methacrylate; ethylene/propylene/1,4 hexadiene-g-maleic anhydride; mixtures of ethylene/propylene/1,4 hexadiene and ethylene/maleic anhydride; ethylene/propylene/norbornadiene/1,4 hexadiene-g-benzoic acid sulfonyl azide; ethylene/propylene/1,4 hexadiene-g-phthalic anhydride sulfonyl azide; mixtures of ethylene/propylene/1,4 hexadiene and ethylene/propylene/1,4 hexadiene-g-maleic anhydride; ethylene/propylene/1,4 hexadiene-g-maleic anhydride neutralized with amine ended oligomer of caprolactam; ethylene/propylene/1,4 hexadiene/maleic anhydride neutralized with zinc rosinate; ethylene/propylene/1,4 hexadiene-g-fumaric acid; ethylene/propylene/1,4 hexadiene/norbornadiene-g-maleic anhydride; ethylene/propylene/1,4 hexadiene/norbornadiene-g-monoethyl ester of maleic anhydride; ethylene/propylene/1,4 hexadiene/norbornadiene-g-fumaric acid; ethylene/propylene/1,4 hexadiene/glycidyl methacrylate; ethylene/propylene/1,4 hexadiene/norbornadiene-g-phthalic anhydride sulfonyl azide; mixtures of ethylene/propylene/1,4 hexadiene and ethylene/monoethyl ester of maleic anhydride; mixtures of ethylene/propylene/1,4 hexadiene and ethylene/butyl hydrogen maleate; mixtures of ethylene/propylene/1,4 hexadiene and ethylene/maleic anhydride, mixtures of butadiene/acrylonitrile and styrene/maleic anhydride; mixtures of styrene/butadiene and ethylene/maleic anhydride; isobutylene/isoprene-g-phthalic anhydride sulfonyl azide; poly(isobutylene)-g-phthalic anhydride sulfonyl azide; mixtures of ethylene/propylene/1,4-hexadiene/norbornadiene and styrene/maleic anhydride; isoprene/phthalic anhydride; mixtures of natural rubber and ethylene/monoethyl ester of maleic anhydride; butyl acrylate/monoethyl ester of fumaric acid; ethyl acrylate/fumaric acid; epichlorohydrin/etnylene oxide; mixtures of ethylene/propylene and ethylene/monoethyl ester of maleic anhydride; ethylene/propylene-g-phthalic anhydride sulfonyl azide; ethylene/propylene/5-ethylidine-2-norbornene-g-fumaric acid, ethylene/propylene/dicyclopentadiene-g-monoethyl ester of maleic acid, ethylene/propylene/5-propenyl-2-norbornene-g-maleic anhydride, ethylene/propylene/tetrahydroindene-g-fumaric acid, ethylene/propylene/1,4-hexadiene/5-ethylidiene-2-norbornene-g-fumaric acid, ethylene/vinyl acetate/CO/glycidyl methacrylate, ethylene/vinyl acetate/CO/glycidyl acrylate, ethylene/methyl acrylate/glycidyl methacrylate, ethylene/methyl acrylate/glycidyl acrylate.

The improvement in ductility of a composition characterized by a higher notched Izod value is approximately proportional to the concentration of adherent sites in the polymeric component as well as to the melt viscosity which is a measure of the molecular weight, and molecular weight distribution within the limits of effective dispersion. Where high concentrations of adherent sites are utilized, it is generally possible to mix two polymers together, i.e., one as the source of adherent sites, and the other as a diluent. Mixing may be accomplished by combining the polymers with the matrix resin separately or in combination with the proviso that the polymer containing the adherent sites must not be combined with the matrix resin prior to combination of any other polymers. In ethylene/propylene/diene polymers molecular weights equivalent to melt flow of 0.5 to 400 g./10 mins. and more by ASTM D 1238 but at 280° C. and a total load of 2160 g. are effective. In the variety of polymers employed a melt flow range of more than 0.1 to 1,000 may be employed but a range of 0.5 to 100 is preferred.

While not being limited to any theory, it is believed that the soft phase polymer only has to adhere with the matrix resin at the interface or surface of the two phases. The mechanism of adhesion is not fully understood and may be achieved by bonds which vary in energy from hydrogen bonding to covalent bonding.

The notched Izod test further characterizes the composition with regard to its ductility. Expressed in ft. lb./inch of notch, notched Izod values in the dry as molded condition for preferred polymers are at least the values represented by the formula:

$$B + 0.2 C_1,$$

$$B + 2.0 + 0.5 (C_2 - 10),$$

$$B + 12.0$$

where B is the notched Izod of the polyester or polycarbonate matrix polymer, $C_1$ is 2 to 10 percent by weight of the at least one polymer, and $C_2$ is 10 to 30 percent by weight of the at least one polymer. $B + 12.0$ applies between 30 and 40 percent.

It has been found generally that dry as molded notched Izod values of at least 8 ft. lbs./inch are readily achieved at lower concentration values than is achieved by prior art materials.

The melt flow of the thermoplastic composition is in the range of about 0.01 to 200 grams per minute by ASTM D-1238 at 280° C. and 2160 g. load. Since the viscosity is highly shear sensitive the compositions of the invention are well suited for extrusion applications.

It is apparent from the above description that a variety of polymers are effective in toughening matrix resins and a substantially large number of combinations are useful. It is therefore not surprising that the limits of effectiveness of some components of the compositions depend on the other components. For example, the lower limit of concentration of an effective adhering site, e.g., maleic anhydride, will probably below than a less effective adhering site, e.g., methacrylic acid. Similarly, the balance between hydroxyl and carboxyl end groups in a matrix may influence the comparative effectiveness of different adherent sites of the at least one polymer. Polymers of polymeric mixtures in the lower modulus range tend to be more effective than those polymers of polymeric mixtures in the higher modulus range and may be useful at lower concentrations of adherent site. The equation describing the relationship between notched Izod and concentration of polymer is applicable only for polymers with an optimum combination of adherence, modulus, and particle size. It is also understood that the mixtures described herein are effective only when the components of the mixture co-exist in the same discrete particles in the matrix resin. However, more than one such polymeric mixture can be present in the toughened thermoplastic composition.

The compositions of the invention may be modified by one or more conventional additives such as stabilizers and inhibitors of oxidative, thermal, and ultraviolet light degradation; lubricants and mold release agents, colorants including dyes and pigments, fibrous and particulate fillers and reinforcements, nucleating agents, flame retardants, etc.

The stabilizers can be incorporated into the composition at any stage in the preparation of the thermoplastic composition. Preferably the stabilizers are included early to preclude the initiation of degradation before the composition can be protected. Such stabilizers must be compatible with the composition.

Viscosity stabilizers such as polycarbodiimides may be used.

The oxidative and thermal stabilizers useful in the materials of the present invention include those used in addition polymers generally. They include, for example, hindered phenols, hydroquinones, secondary amines and varieties of substituted members of those groups and combinations thereof.

The ultraviolet light stabilizers, e.g., up to 2.0 percent, based on the weight of matrix resin, can also be those used in addition polymers generally. Examples of ultraviolet light stabilizers include various substituted resorcinols, salicylates, benzotriazoles, benzophenones, and the like.

Suitable lubricants and mold release agents, e.g., up to 1.0 percent, based on the weight of the composition, are stearic acid, stearic alcohol, stearamides; organic dyes such as nigrosine, etc.; pigments, e.g., titanium dioxide, cadmium sulfide, cadmium sulfide selenide, phthalocyanines, ultramarine blue, carbon black, etc.; up to 50 percent, based on the weight of the composition, of fibrous and particulate fillers and reinforcements, e.g., carbon fibers, glass fibers, amorphous silica, asbestos, calcium silicate, aluminum silicate, magnesium carbonate, kaolin, chalk, powdered quartz, mica, feldspar, etc.; nucleating agents, e.g., talc, calcium fluoride, sodium fluoride, alumina, and finely divided polytetrafluoroethylene, etc.;

Flame retardants including 1 to 10 weight percent of multivalent metal oxides such as the oxides and mixed oxides of iron, tin, antimony, zinc, copper, magnesium, and lead in combination with 3 to 20 weight percent of halogenated aromatic and cycloaliphatic compounds such as hexabromobenzene, Dechlorane Plus ® (sold by Hooker Chemical Company), decabromobiphenyl ether, hexabromodiphenylcarbonate, derivatives of halogenated bisphenol A such as tetrabromobisphenol-A diacetate, etc. Weights are based on the weight of composition.

The colorants (dyes and pigments) can be present in an amount of up to about 5.0 percent by weight, based on the weight of the composition.

The toughened compositions of this invention can be prepared by melt blending, in a closed system, a matrix resin and at least one polymer into a uniform mixture in a multi-screw extruder such as a Werner Pfleiderer extruder having generally 2–5 kneading blocks and at least one reverse pitch to generate high shear, or other conventional plasticating devices such as a Brabender, Banbury mill, or the like. Alternatively, the blends may be made by coprecipitation from solution, blending or by dry mixing together of the components followed by melt fabrication of the dry mixture by extrusion.

The compositions described in the examples are prepared with a Werner Pfleiderer twin screw extruder. The constituents are dry blended and extruded under vacuum 5 to 100° C. above the melting point of the matrix resin, preferably 310° C. or below. The extrudate, which is opaque at temperatures less than 20° C. above the melting point, denoting a two phase system, is cooled in a water bath, cut, vacuum dried and molded into test pieces. Of course, many process variations are possible.

It may be desirable to form a concentrate of the toughened thermoplastic composition. This is accomplished by admixing the matrix resin in higher concentrations based on the weight of total composition, e.g., up to about 50 percent by weight, with the at least one random copolymer. Additional matrix resin is admixed with the composition to yield the desired concentrate, such as a toughened composition containing 1 to 20 percent by weight of at least one random copolymer.

It may be useful to increase the molecular weight of the toughened thermoplastic composition during the preparation of the composition. By way of illustration, an admixture of low molecular weight matrix resin and at least one random copolymer is prepared in a plasticating device as described above and the molecular weight is increased either in the melt or at an elevated temperature below the melting point (solid phase) of the matrix resin. By way of illustration, after melt blending the composition is either (1) held in the melt at a temperature about 10 to 40° C. above the melting point at a pressure of about 1 to 25 mm Hg absolute for up to one hour, or (2) in the solid phase, after cutting, quenching and drying, at an elevated temperature at least 15° C. below the melt temperature of the matrix resin in an inert gas stream for at least two hours.

The toughened thermoplastic compositions can be made into a wide range of useful articles by conventional molding methods employed in the fabrication of thermoplastic articles, i.e., as molded parts, extruded shapes, e.g., tubing, films, sheets, fibers and oriented fibers, laminates and wire coating. "Molding" means forming an article by deforming the blend in the heated plastic state.

The compositions of this invention are characterized by an outstanding combination of properties, foremost of which is outstanding toughness properties in view of the quantity of at least one random copolymer present with the matrix resin. The unusually high toughness provides greater ductility, less sensitivity to scratches and molded in notches, and vastly reduced susceptibility to catastrophic failure when compared with previously known compositions in molded parts. Injection molded parts often are of varying thicknesses and may have scratches, molded-in notches of varying radii, and molded in stresses. In addition, orientation effects may cause varied ductibility throughout a molded part. The maintenance of high uniform values of notched Izod toughness throughout such molded parts characterizes the improved compositions resistance to brittle breaks. The compositions are of sufficient toughness that the effect of minor changes in processing conditions will not cause significant variations in toughness from lot to lot quantities of composition.

EXAMPLES OF THE INVENTION

The following examples illustrate the invention wherein the percentages are by weight unless indicated.

The toughened polyester and polycarbonate compositions are prepared as follows:

The matrix resin and polymer(s) in dry form are mixed after weighing in the proper proportions by tumbling in a polyethylene bag. The mixture is then blended in a 28 mm Werner Pfleiderer extruder in which the hopper is blanketed with nitrogen and the vacuum port maintained at about 25 to 30 inches vacuum. Extruder barrel temperatures are set at about the melting point of the matrix resin ($\pm 10°$ C., level condition) yielding melt temperatures in the range of 5° to about 100° C. above the melting point of the matrix.

The beading exiting the extruder is water quenched, cut and vacuum dried overnight at 120° C. prior to molding. Test bars, $\frac{1}{8}\times 5\times\frac{1}{2}$ inch are molded in 3 oz. and 6 oz. injection molding machines at melt temperatures 10° to 30° C. above the melting point of the matrix resin. The mold temperature is about 90° C. with fast injection and a 20/20 or 20/30 molding cycle (seconds ram forward/second hold). With some compositions containing polyethylene terephthalate, mold temperatures up to 140° C. are used to ensure crystallization. The molded bars are tested using the following test procedures in the dry-as-molded state:

Notched Izod toughness: at each end ASTM D-256-56

Tensile Strength: ASTM D-638-58T

Elongation: ASTM D-638-58T

Flexural Modulus: ASTM D-790-58T

Tensile Modulus of the matrices: ASTM D-638-58T (dry)

Tensile Modulus of the polymers: ASTM D-882 (50% RH)

Melt Flow: ASTM D-1238-73

Particle Size: Electron micrographs of microtomed or fractured surfaces.

Information relating to the matrix resin and polymers used in conjunction with the matrix resin are set forth in Tables 1-A and 1-B, respectively. The acronyms used hereinafter are set forth in Table 2.

TABLE 1-A

MATRICES

| Example | Ma-trix | | Chemical Composition | Inherent Viscosity[a] |
|---|---|---|---|---|
| Control A, | 1,2 | 1 | Polyethylene terephthalate (2GT) Arnite ® A 200 sold by AKSO of the Netherlands | 1.0 |
|  | 3,4 | 2 | Polybutylene terephthalate (4GT) Valo ® 310 sold by General Electric Company | 1.1 |
| Control B, | 5,6 | 3 | 2 GT | 0.7 |
| Control C, | 7,8,9,10 | 4 | 4 GT | 0.9 |
| Control E, | 11,12 | 5 | 1,4-cyclohexylenedimethylene terephthalate/ isophthalate copolymer sold by Tennessee Eastman | 0.8 |
| Control F, | 13 | 6 | Lexan ® 121 sold by General Electric | 0.5 |
| Control G |  | 7 | 70% Matrix 4, 30% chopped glass fiber |  |
|  | 14,15,16 | 8 | 60% Matrix 4, 30% chopped glass fiber |  |
| Control H |  | 9 | 60% Matrix 4, 40% F-1 Wollastonite sold by Interpace treated with 0.5% A 187 silane, sold by Union Carbide |  |
|  | 17 | 10 | 50% Matrix 4, 40% F-1 Wollastonite as in Matrix 9 |  |
| Control I |  | 11 | 55% Matrix 4, 30% chopped glass fiber, 4.5% antimony oxide, 10% decabromobiphenyl ether |  |
|  | 18 | 12 | 45% Matrix 4, remainder as in Matrix 11 |  |

[a]expressed in deciliters/gram, to the nearest tenth.

TABLE 1-B
POLYMERS

| Example | Polymer | Chemical Composition | Melt Flow gms./10 min. |
|---|---|---|---|
| 1,2,5 | 1 | E/IBA/MAA 78/12/10, 72% neutralized with zinc made by the method of Rees, U.S. Pat. No. 3,264,272 | ca. 1[a] |
| 3 | 2 | E/MA/MAME 42/54/4 made as described in Greene, Belgian Patent 818,609 | 4[a] |
| 4 | 3 | Polymer 2, 100% neutralized with zinc acetate | |
| 6 | 4 | E/VA/GMA 67/28/5 made by high pressure free radical polymerization | 37[a] |
| 7 | 5 | E/VA/GMA 67/28/5 made as described in polymer 4 | |
| 8 | 6 | E/VA/CO/GMA 67/24/6/2 made as described in Hammer U.S. Pat. No. 3,780,140 | 78[a] |
| 9,15 | 7 | E/VA/CO/GMA 68/20/9°/2 made as described in polymer 6 | 34[a] |
| 10,16,17,18 | 8 | E/MA/GMA 75/22/3 made by high pressure free radical polymerization | 20–37[a] |
| 11,12,13,14 | 9 | E/P/1,4 hexadiene/2,5 norbornadiene-g-1.4% FA 68/26/6/0.15 prepared by the method of Caywood U.S. Ser. No. 322,360 but using a variety of unsaturated monomers at peak reaction temperature of 325°–400° C. and using a static mixer such as those marketed by Kenics Company between the extruder screw(s) and the die. | 3[b] |

[a] Measured by ASTM D-1238 at 190° C. and 2160 grams total load (Condition E).
[b] Measured by ASTM D-1238 but at 280° C. and 2160 grams total load.

TABLE 2
TABLE OF ACRONYMS

| | |
|---|---|
| E | ethylene |
| IBA | isobutyl acrylate |
| MAA | methacrylic acid |
| MA | methyl acrylate |
| MAME | monoethyl ester of maleic anhydride |
| VA | vinyl acetate |
| CO | carbon monoxide |
| GMA | glycidyl methacrylate |
| FA | fumaric acid |
| P | propylene |
| -g- | graft |

EXAMPLES 1 to 18

These Examples prepared according to the procedure described above are set forth in Table 3.

Control A is molded of a commercially available comparatively high molecular weight polyethylene terephthalate. Examples 1 and 2 show the increase in ductility characterized by a sharp increase in notched Izod with up to 30 weight percent addition of polymer. Similar effects are illustrated with two additional polymers in polybutylene terephthalate, Examples 3 and 4.

Example 5 prepared with Control B, which has substantially lower inherent viscosity than Control A, illustrates, by comparison with Example 2, the general fact that lower molecular weight materials are more difficult to toughen than high molecular weight materials. Example 6, made in a different sample lot of Matrix 3, illustrates, similarly to Examples 3 and 4, substantial toughening by a soft polymer with effective adherent sites.

Examples 7 to 10 illustrate toughening of polybutylene terephthalate of lower molecular weight than that used in Examples 3 and 4 using several different polymers.

Examples 11 and 12 illustrate toughening of a polyester copolymer. The same toughener is used to improve the toughness of a polycarbonate polymer, Example 13 in comparison with Control F. The improvement in ductility characterized by higher notched Izod than the control with a 2 mil notch is of particular significance in this Example.

Examples 14 through 16 illustrate toughening of glass reinforced material in comparison with Control G. Example 17 illustrates toughening of mineral filled material in comparison with Control H. Example 18 illustrates toughening of glass reinforced, flame retarded polyester in comparison with Control I. The degree of flame retardance of Example 18 is demonstrated by tests which yield a V-0 rating in 1/16 inch sections by Underwriters Laboratory specification test UL 94. Examples 14 to 18 were prepared by compounding the reinforcing and flame retardant additives with the toughened polyester on a two inch single screw extruder fitted with a vacuum port.

TABLE 3

| Example | Matrix | Polymer or Mixture | Polymer Conc. (%) | N.I.[a] (ft.-lb./inch) | T.S. (Mp.s.i.) | Elongation (%) | Flex. Mod. (Mp.s.i.) | Polymer Tensile Mod. (p.s.i.) | Polymer Dispersed Particle Size (Microns) |
|---|---|---|---|---|---|---|---|---|---|
| Control A | 1 | — | — | 0.6 | | | | | |
| 1 | 1 | 1 | 20 | 4.3/3.9 | 7.3 | 68 | 260 | 17,000 | |
| 2 | 1 | 1 | 30 | 23.1/16.1 | 5.6 | 160 | 200 | 17,000[b] | |
| 3 | 2 | 2 | 20 | 9.0/12.8 | 5.4 | 122 | 280 | | 240 |
| 4 | 2 | 3 | 20 | 17.8/18.2 | 5.0 | 67 | 220 | | |
| Control B | 3 | — | — | 0.5 | | | | | |
| 5 | 3 | 1 | 20 | 1.7/1.9 | 7.4 | 13 | | 17,000 | |
| 6 | 3 | 4 | 20 | 17.7/15.8 | 6.3 | 170 | 270 | 1,100 | |
| Control C | 4 | — | — | 0.6/0.6 | 8.3 | 56[c] | 350 | | |
| 7 | 4 | 5 | 20 | 11.8/10.8 | 5.2 | 40 | 230 | | |
| Control D | 4 | — | — | 0.6/0.6 | 8.2 | 13[c] | | | |

TABLE 3-continued

| Example | Matrix | Polymer or Mixture | Polymer Conc. (%) | N.I.[a] (ft.-lb./ inch) | T.S. (Mp.s.i.) | Elongation (%) | Flex. Mod. (Mp.s.i.) | Polymer Tensile Mod. (p.s.i.) | Polymer Dispersed Particle Size (Microns) |
|---|---|---|---|---|---|---|---|---|---|
| 8 | 4 | 6 | 13 | 8.0/7.3 | 6.0 | 75 | | | |
| 9 | 4 | 7 | 13 | 9.2/8.2 | 6.1 | 50 | | | |
| 10 | 4 | 8 | 14.3 | 12.3/11.9 | 5.5 | 15 | 240 | 1,460 | 0.1–0.5 |
| Control E | 5 | — | — | 0.9/0.9 | 7.2 | 228 | 250 | | |
| 11 | 5 | 9 | 10 | 16.5/16.2 | 5.3 | 317 | 220 | | |
| 12 | 5 | 9 | 20 | 18.4/15.7 | 4.2 | 222 | 160 | | |
| Control F | 6 | — | — | 16[d],[e] | 9.5[d] | 100[d] | 340[d] | | |
| 13 | 6 | 9 | 20 | 11.3/10.8[f] | 6.0 | 74 | 230 | | |
| Control G | 7 | — | — | 1.5/1.9 | 18.5 | 2.9 | 1160 | | |
| 14 | 8 | 9 | 10 | 3.0/3.5 | 14.3 | 3.3 | 960 | | |
| 15 | 8 | 7 | 10 | 2.8/3.1 | 15.7 | 3.0 | 980 | | |
| 16 | 8 | 8 | 10 | 3.0/3.5 | 15.8 | 3.2 | 990 | | |
| Control H | 9 | — | — | 0.6/0.6 | 10.3 | 2.1 | 1260 | | |
| 17 | 10 | 8 | 10 | 1.2/1.2 | 7.4 | 3.1 | 1040 | | |
| Control I | 11 | — | — | 1.5/1.6 | 19.0 | 2.0 | 1340 | | |
| 18 | 12 | 8 | 10 | 2.6/2.8 | 15.0 | 2.5 | 1100 | | |

[a]Samples with Notched Izod value in the range of 10 ft.-lbs./inch or more do not break completely. Values over the virgule represent the end of a bar near the gate; values under the virgule represent the far end of the bar.
[b]Molded at 140° C. mold temperature.
[c]Separate moldings indicate variability in elongation.
[d]From published data.
[e]1.6/1.6 with 2 mil notch.
[f]8.8/9.1 with 2 mil notch.
Note: The particle size of the polymers in all examples is 3.0 microns or less.

EXAMPLE 19

This Example describes extruding and stretching a composition of 1,4-polybutylene glycol terephthalate (Matrix 4) and a copolymer of ethylene/methyl acrylate/glycidyl methacrylate (Polymer 8).

A composition of 87 weight percent of Matrix 4 and 13 weight percent of Polymer 8 is melt extruded into the form of a film. The composition is extruded at a temperature in the range of 260° C. (initial end of barrel) to 285° C. (at the die end of the barrel) in a Sterling extruder through an 8 inch (20.32 centimeters) wide Johnson die maintained at a temperature of about 295° C. The molten film is extruded onto the surface of a rotating (at about 15 feet (4.572 meters) per minute) quench drum maintained at a temperature of about 42° C. Full wire electrostatic pinning is used to insure uniform quenching of the cast film which is 10 mils (250 microns) in thickness. Sheets, 4 inches by 4 inches (10.16 centimeters by 10.16 centimeters) cut from the roll of cast film are stretched simultaneously (in a T. M. Long Co. stretcher) 3× in mutually perpendicular directions at a temperature of about 60° C., and thereafter heat set in frames at 200° C. in an oven. The cast film stretches uniformly in all directions. The following physical properties are measured on the cast film and the stretched film.

Tensile strength (p.s.i.)—ASTM test D-882
Tensile modulus (p.s.i.)—ASTM test D-882
Elongation at break (percent)—ASTM test D-882
Pneumatic ball impact resistance test (kilogram-centimeter/mil)—ASTM test D-3099
Tear initiation test (grams/mil)—ASTM test D-1004
Tear propagation test (grams/mil)—ASTM test D-1922
Density (gradient tube method) (grams/cc)—ASTM test D-1505
Oxygen transmission rate (cc-mil/100 sq. in.-24 hrs. atmosphere)—ASTM test D-1434.

A control film which is extruded from 100 percent Matrix 4 is cast in the same manner as that described above for the above composition. The above physical properties are measured on the control cast Matrix 4 film, the cast film from the composition, and the stretched film of the composition. The physical properties are given in Table 4. It is found that the control film of cast 100 percent Matrix 4 can not be stretched under the conditions employed with the composition of this Example.

A sample of the cast film from the composition is thermoformed, after being preheated for about 10 seconds in an oven heated to about 210° C., into the shape of a dish 1.5 inches (3.81 centimeters) deep by 5 inches (12.7 centimeters) in diameter. The male portion of the dish mold is heated to about 200° C. and the female portion is at about 160° C.

TABLE 4

| Film Description | Tensile Strength (p.s.i.) | Tensile Modulus (p.s.i.) | Elongation At Break (%) | Impact (kg.-cm./mil) | Tear Initiation (g./mil) | Tear Propagation (g./mil.) | Density (g./cc.) | Oxygen[a] Permeability |
|---|---|---|---|---|---|---|---|---|
| 100% Matrix 4 Cast film (control) | 5,500 | 222,000 | 388 | 1.42 | 514 | 30 | 1.292 | 11.2 |
| Example 19 Blend-cast film | 3,500 | 135,000 | 433 | 1.69 | 337 | 46 | 1.242 | High |
| Example 19 Blend-stretched film | 14,500 | 270,000 | 89 | 4.52 | 382 | 4 | 1.294 | 10.8 |

[a]cc . mil/100 sq. in . 24 hrs. . atmosphere

I claim:

1. A toughened multi-phase thermoplastic composition consisting essentially of one phase containing 60 to 99 percent by weight of a matrix resin taken from the class consisting essentially of (a) polyester matrix resin having an inherent viscosity in the range of about 0.4 to 4.0 diciliters/gram, said polyester being prepared from an aromatic dicarboxylic acid having from 8 to 14 carbon atoms and at least one glycol taken from the class consisting of a glycol of the formula $HO(CH_2)_nOH$ where n is an integer of 2 to 10, neopentyl glycol and cyclohexane dimethanol, a portion of the moles of acid being replaceable by at least one acid taken from the group consisting of at least on different aromatic dicarboxylic acid having from 8 to 14 carbon atoms in an amount up to 50 mole percent, and an aliphatic dicarboxylic acid having from 2 to 12 carbon atoms in an amount up to 20 mole percent; and (b) polycarbonate matrix resin having an inherent viscosity in the range of about 0.35 to 0.75 deciliter/gram, said polycarbonate possessing recurring structural units of the formula:

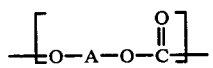

where A is a divalent aromatic radical of a dihydric phenol; and 1 to 40 percent by weight of at least one other phase containing particles of at least one random copolymer taken from the class consisting of branched and straight chain polymers, said at least one random copolymer having a particle size in the range of 0.01 to 1.0 microns, having sites which adhere to the matrix resin, and having a tensile modulus in the range of about 1.0 to 20,000 p.s.i., the ratio of the tensile modulus of the matrix resin to tensile modulus of said at least one random copolymer being greater than 10 to 1, and wherein said at least one random copolymer is represented by the formula:

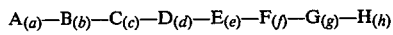

derived in any order from monomers A to H wherein
A is ethylene;
B is CO:
C is an unsaturated monomer taken from the class consisting of $\alpha,\beta$-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;
D is an unsaturated epoxide of 4 to 11 carbon atoms;
E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;
F is an unsaturated monomer taken from the class consisting of acrylate esters having from 4 to 22 carbon atoms, vinyl esters of acids having from 1 to 20 carbon atoms, vinyl ethers of 3 to 20 carbon atoms, vinyl and vinylidene halides, and nitriles having from 3 to 6 carbon atoms;
G is an unsaturated monomer having at least one substituent selected from the group consisting of pendant hydrocarbon chains of 1 to 12 carbon atoms and pendant aromatic groups which may have 1 to 6 substituent groups having a total of 14 carbon atoms; and
H is an unsaturated monomer taken from the class consisting of branched, straight chain and cyclic compounds having from 4 to 14 carbon atoms and at least one additional unsaturated carbon-carbon bond capable of being grafted with a monomer having at least one reactive group of the type defined in C, D and E;

monomers A to H being present in the following mole fraction:

(a) 0 to 0.95, (b) 0 to 0.30, (c) 0 to 0.5, (d) 0 to 0.5, (e) 0 to 0.5, (f) 0 to 0.99, (g) 0 to 0.99, and (h) 0 to 0.99; said at least one polymer having present at least one of monomers B, C, D and E with the proviso that when monomer A is present, in addition to at least one of monomers B, C, D or E, at least one of monomers F, G and H is also present.

2. A composition according to claim 1 wherein the tensile modulus of said at least one random copolymer is about 5.0 to 20,000 p.s.i. and the ratio of tensile modulus is greater than 20 to 1.

3. A composition according to claim 1 wherein said at least one random copolymer is present as part of a mixture.

4. A composition according to claim 1 wherein the ratio of tensile modulus is greater than 20 to 1.

5. A composition according to claim 1 wherein the notched Izod in the dry as molded condition is at least the values represented by the formulae:

$B + 0.2 C_1$ $B + 2.0 + 0.5 (C_2 - 10)$, $B + 12.0$ where B is the notched Izod of the polyester matrix resin, $C_1$ is 2 to 10 percent by weight of the at least one random copolymer, and $C_2$ is 10 to 30 percent by weight of the at least one random copolymer, and the notched Izod is at least $B + 12.0$ when the concentration of the at least one random copolymer is between 30 and 40 percent by weight.

6. A composition according to claim 1 wherein the notched Izod in the dry as molded condition is at least the values represented by the formulae:

$B + 0.2 C_1$ $B + 2.0 + 0.5 (C_2 - 10)$, $B + 12.0$ where B is the notched Izod of the polycarbonate matrix resin, $C_1$ is 2 to 10 percent by weight of the at least one random copolymer, and $C_2$ is 10 to 30 percent by weight of the at least one random copolymer, and the notched Izod is at least B+12.0 when the concentration of the at least one random copolymer is between 30 and 40 percent by weight.

7. A composition according to claim 1 wherein the notched Izod value, dry as molded, is greater than 8 ft. lbs./inch when the concentration of said at least one random copolymer is from 5 to 20 percent by weight.

8. A composition according to claim 1 wherein there is present up to 5.0 percent by weight, based on the weight of the composition, of at least one colorant.

9. A composition according to claim 1 wherein there is present up to 50 percent by weight, based on the weight of the composition, of glass fibers.

10. A composition according to claim 1 wherein there is present up to 50 percent by weight, based on the weight of the composition, of fibrous and particulate mineral fillers and reinforcements.

11. A composition according to claim 1 wherein there is present up to 1.0 percent by weight, based on the weight of polyester, of a stabilizer.

12. A composition according to claim 1 wherein there is present, based of the weight of the composition, of up to 10 percent of a polyvalent metal oxide and up to 20 percent of a halogenated organic compound taken from the group consisting of aromatic and cycloaliphatic compounds.

13. A composition according to claim 1 wherein said at least one random copolymer has present carbon monoxide.

14. A composition according to claim 1 wherein said at least one random copolymer has present an unsaturated monomer taken from the class consisting of $\alpha,\beta$-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions.

15. A composition according to claim 1 wherein said at least one random copolymer has present an unsaturated epoxide of 4 to 11 carbon atoms.

16. A composition according to claim 1 wherein said at least one random copolymer has present the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions.

17. A composition according to claim 1 wherein said at least one random copolymer has present an unsaturated monomer taken from the class consisting of acrylate esters having from 4 to 22 carbon atoms, vinyl esters of acids having from 1 to 20 carbon atoms, vinyl ethers of 3 to 20 carbon atoms, vinyl and vinylidene halides, and nitriles having from 3 to 6 carbon atoms.

18. A composition according to claim 1 wherein said at least one random copolymer has present an unsaturated monomer having pendant hydrocarbon chains of 1 to 12 carbon atoms capable of being grafted with monomers having at least one reactive group of the type defined in C, D and E, and pendant aromatic groups which may have 1 to 6 substituent groups having a total of 14 carbon atoms.

19. A composition according to claim 1 wherein said at least one random copolymer has present an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E.

20. A composition according to claim 4 wherein said at least one random copolymer consists essentially of polymerized ethylene, at least one polymerized $\alpha$-olefin of 3 to 6 carbon atoms, and at least one polymerized unsaturated monomer taken from the class consisting of branched, straight chain and cyclic compounds having from 4 to 14 carbon atoms and at least one additional nonconjugated unsaturated carbon-carbon bond, and grafted thereto an unsaturated monomer taken from the class consisting of $\alpha,\beta$-ethylenically unsaturated dicarboxylic acids having from 3 to 8 carbon atoms, and derivatives thereof taken from the class consisting of monoesters of alcohols of 1 to 29 carbon atoms, anhydrides of the dicarboxylic acids, the metal salts of the dicarboxylic acids and the monoesters of said dicarboxylic acid having from 0 to 100 percent of the carboxylic groups ionized by neutralization with metal ions.

21. A composition according to claim 20 wherein said at least one random copolymer is a copolymer of ethylene, propylene and 1,4-hexadiene having grafted thereto an unsaturated monomer taken from the class consisting of fumaric acid, maleic acid, maleic anhydride and the monoalkyl ester of said acids in which the alkyl group of the ester has 1 to 3 carbon atoms, said at least one polymer having an after grafting melt flow rate of 0.1 to 100 g./10 minutes, ASTM D 1238 at 280° C. and a total load of 2160 grams.

22. A composition according to claim 20 wherein said at least one random copolymer is a tetrapolymer of ethylene, propylene, 1,4-hexadiene and 2,5-norbornadiene having grafted thereto an unsaturated monomer taken from the class consisting of furmaric acid, maleic acid, maleic anhydride and the monoalkyl ester fumaric said acids in which the alkyl group of the ester has 1 to 3 carbon atoms, said at least one polymer having an after grafting melt flow rate of 0.1 to 100 g./10 minutes, ASTM D 1238 at 280° C. and a total load of 2160 grams.

23. A composition according to claim 21 wherein said matrix resin is polyethylene terephthalate.

24. A composition according to claim 22 wherein said matrix resin is polyethylene terephthalate.

25. A composition according to claim 1 wherein said matrix resin is polybutylene terephthalate.

26. A composition according to claim 22 wherein said matrix resin is polybutylene terephthalate.

27. A composition according to claim 21 wherein the matrix resin is a polycarbonate.

28. A composition according to claim 22 wherein the matrix resin is a polycarbonate.

29. A composition according to claim 4 wherein said at least one random copolymer is a random copolymer consisting essentially of polymerized ethylene, alkyl acrylate selected from methyl and ethyl acrylate, and from about 0.0025–0.077 mole/100 g. polymer of a mono alkyl ester of 1,4-butene-dioic acid in which the alkyl group of the ester has 1 to 6 carbon atoms, said copolymer having from about 0.64–0.80 mole of ($-CO_2-$) units per 100 grams of copolymer, and having 0 to 100 percent of the esters of 1,4-butene-dioic acid ionized by neutralization with metal ions selected from lithium, sodium, potassium, calcium and zinc ions, said copolymer having a melt index at 190° C. and a total load of 2160 grams of about 0.3 to 100 grams/10 minutes, and when neutralized having a melt flow rate of 0.04 to 100 grams/10 minutes under condition G of ASTM D 1238.

30. A composition according to claim 29 wherein said mono alkyl ester of 1,4-butene-dioic acid consists essentially of ethyl hydrogen maleate.

31. A composition according to claim 30 wherein said matrix resin is polyethylene terephthalate.

32. A composition according to claim 30 wherein said matrix resin is polybutylene terephthalate.

33. A process for the preparation of a toughened multi-phase thermoplastic composition which comprises, in a closed system, (A) admixing (1) 60 to 99 percent by weight of a matrix resin taken from the class consisting essentially of (a) polyester matrix resin having an inherent viscosity in the range of about 0.4 to 4.0 deciliters/gram, said polyester being prepared from an aromatic dicarboxylic acid having from 8 to 14 carbon atoms and at least one glycol taken from the class consisting if a glycol of the formula $HO(CH_2)_nOH$ where n is an integer of 2 to 10, neopentyl glycol and cyclohexane dimethanol, a portion of the moles of acid being replaceable by at least one acid taken from the group consisting of at least one different aromatic dicarboxylic acid having from 8 to 14 carbon atoms in an amount up to 50 mole percent, and an aliphatic dicarboxylic acid having from 2 to 12 carbon atoms in an amount up to 20 mole percent; and (b) polycarbonate matrix resin having an inherent viscosity in the range of about 0.35 to 0.75 deciliter/gram, said polycarbonate possessing recurring structural units of the formula:

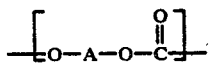

where A is a divalent aromatic radical of a dihydric phenol; and (2) 1 to 40 percent by weight of at least one random copolymer having sites which adhere to the matrix, the components being mixed at a temperature in the range of about 5° to 100° C. above the melting point of said matrix resin and (B) shearing to disperse said at least one random copolymer in said matrix to comprise particles of a size in the range of 0.01 to 1.0 microns, said at least one random copolymer having a tensile modulus in the range of 1.0 to 20,000 p.s.i., the ratio of the tensile modulus of said matrix to tensile modulus of said at least one random copolymer being greater than 10 to 1, and wherein said at least one random copolymer is represented by the formula:

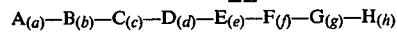

derived in any order from monomers A to H wherein
A is ethylene;
B is CO;
C is an unsaturated monomer taken from the class consisting of $\alpha,\beta$-ethylenically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions and dicarboxylic acids and monoesters of the dicarboxylic acid neutralized by amine-ended caprolactam oligomers having a DP of 6 to 24;
D is an unsaturated epoxide of 4 to 11 carbon atoms;
E is the residue derived by the loss of nitrogen from an aromatic sulfonyl azide substituted by carboxylic acids taken from the class consisting of monocarboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;
F is an unsaturated monomer taken from the class consisting of acrylate esters having from 4 to 22 carbon atoms, vinyl esters of acids having from 1 to 20 carbon atoms, vinyl ethers of 3 to 20 carbon atoms, vinyl and vinylidene halides, and nitriles having from 3 to 6 carbon atoms;
G is an unsaturated monomer having at least one substituent selected from the group consisting of pendant hydrocarbon chains of 1 to 12 carbon atoms and pendant aromatic groups which may have 1 to 6 substituent groups having a total of 14 carbon atoms; and
H is an unsaturated monomer taken from the class consisting of branched, straight chain and cyclic compounds having from 4 to 14 carbon atoms and at least one additional unsaturated carbon-carbon bond capable of being grafted with a monomer having at least one reactive group of the type defined in C, D and E;
monomers A to H being present in the following mole fraction:
(a) 0 to 0.95, (b) 0 to 0.30, (c) 0 to 0.5, (d) 0 to 0.5, (e) 0 to 0.5, (f) 0 to 0.99, (g) 0 to 0.99, and (h) 0 to 0.99; said at least one polymer having present at least one of monomers B, C, D and E with the proviso that when monomer A is present, in addition to at least one of monomers B, C, D and E, at least one of monomers F, G and H is also present.

34. A composition according to claim 1 in the form of a film.